US006792838B2

(12) United States Patent
Brooks et al.

(10) Patent No.: US 6,792,838 B2
(45) Date of Patent: Sep. 21, 2004

(54) INTEGRATED FASTENING SYSTEM

(75) Inventors: Lawrence Antony Brooks, Sheffield (GB); Steven Sidwell, Birmingham (GB)

(73) Assignee: Uni-Screw Worldwide, Inc., Knoxville, TN (US)

( * ) Notice: Subject to any disclaimer, the term of this patent is extended or adjusted under 35 U.S.C. 154(b) by 46 days.

(21) Appl. No.: 10/175,636

(22) Filed: Jun. 20, 2002

(65) Prior Publication Data
US 2003/0209113 A1 Nov. 13, 2003

(30) Foreign Application Priority Data
May 10, 2002 (GB) .............................................. 0210743

(51) Int. Cl.[7] .............................................. B25B 23/00
(52) U.S. Cl. .......................................... 81/439; 81/440
(58) Field of Search ................................ 81/439, 124.4, 81/121.1, 124.5, 440; 411/403, 410

(56) References Cited

U.S. PATENT DOCUMENTS

| 445,451 A | * | 1/1891 | Miller ........................ 81/124.4 |
| 3,463,209 A |   | 8/1969 | Podolsky |
| 4,258,596 A | * | 3/1981 | Bisbing et al. ................ 81/436 |
| 5,231,733 A | * | 8/1993 | Dittman ........................ 16/412 |
| 5,943,924 A | * | 8/1999 | Jarvis ........................ 81/177.2 |
| 5,974,916 A | * | 11/1999 | Lassiter ..................... 81/121.1 |

FOREIGN PATENT DOCUMENTS

| GB | 1150382 | 4/1969 |
| GB | 2 285 940 A | 8/1995 |
| GB | 2 329 947 A | 4/1999 |
| WO | WO 01/77538 A1 | 10/2001 |

* cited by examiner

Primary Examiner—Lee D. Wilson
(74) Attorney, Agent, or Firm—Fish & Richardson P.C.

(57) ABSTRACT

A fastener system comprises a plurality of ranges of size of threaded fastener, each fastener having a head provided with a recess to receive a tool to rotatingly drive the fastener. In each range of sizes, the largest size of fastener has a recess comprising a plurality of driving recess tiers of reducing size superimposed on one another. The range of fasteners to be driven by the tool includes a first fastener whose recess is shaped to be drivingly engaged by at least the third and second smallest tiers of the tool, but not the smallest tier. The recess receiving the second smallest tier of the tool is deep enough to freely accommodate the smallest tier.

20 Claims, 4 Drawing Sheets

INTEGRATED FASTENING SYSTEM

BACKGROUND OF THE INVENTION

The present invention relates to fasteners in particular screws and bolts having a head provided with a recess to receive a driving tool for turning the screw or bolt.

GB-A-1150382 appears to be the first disclosure of a screw provided with a multi-tiered recess and a corresponding multi-tiered driver. GB-A-2285940 discloses essentially the same idea. Both these publications describe the advantages provided by the arrangements disclosed. The first is that the recesses are essentially parallel-sided and consequently eliminate cam-out problems that are associated with cross-head recesses. Secondly, they give the possibility of a single driving tool being suitable for driving a wide range of screw sizes.

The single driving tool typically has three (for example) tiers of driving surfaces which are employed to drive large screws having three tiers of recess. However, the same tool can be employed with smaller screws having only two tiers of recess, the largest tier being omitted. Indeed, even smaller screws may have only one, the smallest tier, in their recess and be driven by the smallest tier only of the tool.

GB-A-2329947 discloses a similar arrangement, and WO-A-0177538 discloses tiers that have such a small extent in the recesses of screws and bolts that, at the torques at which the screws are intended to be operated, they cannot be turned unless at least two tiers are both engaged by the tool. Otherwise, the screw is arranged to round out of engagement with the driving tool. This provides a security feature in that only the appropriate tool will undo the screw.

However, until co-pending application GB0124122.3 was filed by the present applicant on 8 Oct. 2001, these ideas were not a practical reality, because the recesses could not competitively be formed in screws and bolts.

Now, interest is developing in such fastening systems. However, the system so far has primarily been applied only to the smaller wood and machine screws, that is to say, No.6- to No.10-size wood screws (ie about 2 mm to 5 mm diameter—lengths about 15 mm to 100 mm) and M2 to M10 machine screws (ie 2 mm diameter threads to 10 mm). However, there is a need, particularly in the machine screw and bolt field, for larger sizes.

In principle, there is no limit to the number of tiers that can be included or added to a recess or driver. But there comes a point when the driver, if it is big enough and strong enough to drive the largest screws and bolts, it will be far too awkward, bulky and heavy to sensitively drive the smaller screws. Moreover, in larger screws, the torque transmission capability of the smaller tiers becomes insignificant.

Consequently it is desirable to divide the system between ranges of sizes of screw/bolt, but, in so doing, some of the benefit of the system is lost, because at least two tools then become necessary to cover the entire range of sizes.

SUMMARY OF THE INVENTION

Accordingly, it is an object of the present invention to provide a system that mitigates this loss of universality.

In accordance with the present invention there is provided a fastener system comprising a plurality of ranges of size of threaded fastener, each fastener having a head provided with a recess to receive a tool to rotatingly drive the fastener, and wherein:

in each range of sizes, the largest size of fastener has a recess comprising a plurality of driving tiers of reducing size superimposed on one another, each tier having sides which are substantially parallel a long axis of the fastener and define a polygon in section;

between two adjacent size ranges, there is a common tier, being the largest tier of the recess of the smaller size range and the smallest tier of the recess of the larger size range, which common tier is the same section in each range; and the depth from the base of the largest recess to the base of the smallest recess in the smaller size range is less than the depth of the smallest recess in the larger size range.

Preferably, there are two size ranges of fasteners comprising screws of diameters from about 2 mm to about 10 mm and from about 10 mm to about 30 mm. The screws may be size M2 machine screws to size M10 in the small range and size M12 to M30 in the large size range.

The common tier is preferably hexagonal in section, but it equally could be pentagonal or some other straight-sided polygon.

The common tier preferably has a diameter of about 6 mm, preferably 5.9 mm.

The smaller size range of fasteners may have three tiers in larger fasteners, two tiers in middle size fasteners, and one in the smallest fasteners. The larger size range may have four tiers in the larger fasteners, and three tiers in smaller fasteners. Of course, smaller fasteners in the larger size range are going to be bigger than larger size fasteners in the smaller size range, unless it is desired that there might be screws of the same dimension, some having recesses in common with the larger size range of fasteners, and some having recesses in common with the smaller size range of fasteners By this simple expedient, then, of a common tier between the two size ranges, a driver adapted for the smaller size range can be employed to drive the larger size of fasteners, and vice versa. This is a very useful feature because it is frequently the case that either of the following events occurs:

a) A user spends some time aligning objects to be joined by a fastener and, when aligned, holds them in place while a fastener is inserted. Then, he/she reaches for the tool to drive the fastener, only to find that the wrong driving bit is fitted in the tool! As a result, often the entire workpiece has to be dismantled while the user fits the right bit to the tool (or finds the right tool) before starting again.

b) One of the benefits of the fastening system to which the present invention relates is that, because the recess is parallel-sided, there is no cam-out. Consequently, it is possible to fit a fastener onto the end of the tool without the fastener immediately falling off. This is useful because, often, access to the location where the fastener is to be applied is restricted or confined. Being able to manoeuvre a fastener into position with the aid of the driving tool frequently facilitates this task.

With the present invention both situations can be accommodated conveniently. In the first case, either a small driver can initiate the connection of the fastener (from the larger size range), or, indeed, a large driver can initiate connection of a fastener from the smaller size range, (as long as that fastener has the largest size recess provided for that range). Clearly, with the wrong driver it is not advisable to attempt final tightening, but that is not the issue. Once the fastener has been sufficiently engaged, the right driver can be found and applied for final tightening of the fastener.

As for event b) above, employing the driver to position fasteners in a workpiece does, indeed, frequently facilitate connection. However, the problem is not assisted as much as it might be when the proper driver is used. With larger sizes, the driver is often no slimmer than a user's own fingers, for example. However, by using the driver appropriate for a smaller range of fasteners to locate and begin driving of a fastener from the larger range, easier and quicker engagement of the workpiece is likely.

In the machine screw field, it is found that a single driver is capable of driving all screws in the range M2 to M10. M2 screws typically require no more than about 0.3 Nm of torque to be applied, and a single 2.5 mm diameter, 1.5 mm depth, driving tier is found adequate. M10 screws typically require about 70 Nm, and three tiers, or at least two larger tiers, are necessary to transmit this torque. The largest tier typically might have the dimensions mentioned above for the smallest tier; 4 mm diameter, 1 mm depth for a middle tier; and 6 mm diameter, 1.5 mm depth for the largest tier.

However, for bolts in the range M12 to M30, a driver tool of 6 mm diameter is not adequate to transmit the torques expected, namely about 130 Nm for M12, and about 2000 Nm for M30. Hexagonal bar of the grade steel from which drivers are typically made will shear at about 150 Nm torque.

Nevertheless, the benefit of the multi-tier system can still be experienced with an upgraded tool but, in practice, it is found best not only to increase the overall size of tiers, but also to provide four of them. Preferably, the tiers should have about 6, 10, 14 and 19 mm diameters, and each about 2.5 mm depth.

The largest diameter tier is ideally considerably deeper.

The tiers can have any non-circular section (by which "polygon" and "polygonal", as used herein, are broadly meant) and each tier may be the same or different, aligned or offset, either rotationally, axially or both. The term diameter used herein is therefore imprecise and is merely for approximate guide. With reference to a hexagonal profile, the diameter referred to is flat-to-flat.

In this first aspect of the present invention, there is also provided a set of punches having tier-forming sections for forming the recess of fasteners of the fastening system as defined in this first aspect, said set including one punch for a smaller size range of fasteners that has a largest tier-forming section of a common section, and another punch that has a smallest tier-forming section of the same common section.

A different problem, on the same theme as that addressed by the first aspect of the present invention, is that, even in a given size range such as M2 to M10 as described above, at least at size M10 there is a potential gap between the driver's capability and the required torque. The solution is to embed the recess further into the head of the fastener. This is possible because the head is inevitably bigger on larger screws and bolts. Embedding the recess further creates more torque transmission area of the largest diameter tier of the driver, and consequently the greater torques can be transmitted.

However, two issues arise. Firstly, in the automotive industry in particular, anti-corrosion lacquers are generally applied to bolts. This lacquer can fill the smallest recess tier and prevent proper and complete engagement of the driver into the recess, at least with normal hand pressures applied to the driving tool, and especially with deep recesses. Secondly, the deeper a punch is driven into a screw head to form the recess (in the cold-forming process employed) the more likely it is that the tip of the punch (forming the smallest recess tier) will snap-off, in time.

Accordingly, it is an object of the second aspect of the present invention to provide a system that solves these problems, or at least mitigates their effects.

In this aspect, the present invention provides a fastening system for a range of different sizes of fastener in which each fastener is provided with a recess to receive a tool to rotatingly drive the fastener, wherein:

the tool has at least three tiers of driving section at its end, each tier comprising sides disposed substantially parallel a long axis of the tool and forming a polygon in section, the tiers becoming progressively smaller in section near the end of the tool; and the range of fasteners to be driven by the tool includes a first fastener whose recess is shaped to be drivingly engaged by at least the third and second smallest tiers of the tool, but not the smallest tier, the recess receiving the second smallest tier of the tool being deep enough to accommodate the smallest tier without any driving engagement therebetween, and without preventing full engagement of said second and third tiers in the corresponding tiers of the recess in the fastener.

The range preferably includes a second, smaller fastener whose recess is shaped to be driven by the smallest, and the second and third smallest, tiers of the tool, wherein:

the recesses of the first and second fasteners are such that the depth of engagement of the third smallest tier of the tool in the recess of the second fastener is less than the depth of engagement of the third smallest tier of the tool in the recess of the first fastener.

The range of fasteners may comprises screws of diameters from about 2 mm to about 10 mm. Indeed, the screws may be size M2 machine screws to size M10. In this event, said first screw may be M10 and said second screw may be M8.

The recesses of the first and second fasteners are preferably such that the depth of engagement of the third smallest tier of the tool in the recess of the second fastener is about 1 mm and the depth of engagement of the third smallest tier of the tool in the recess of the first fastener is about 3 mm. The third smallest tier may have a diameter of about 6 mm, preferably 5.9 mm.

In this second aspect, a set of punches is also provided, having tier-forming sections for forming the recess of fasteners of the fastening system as defined in this second aspect, said set including a first punch for a smaller size of fastener and that has three tier-forming sections, and a second punch for a larger size of fastener and that has two tier-forming sections, wherein:

the larger tier of the second punch has the same section as the largest tier of the first punch; the smaller tier of the second punch has the same section as the middle sized tier of the first punch; and the length of the smaller tier of the second punch is the same or longer than the combined depth of the middle sized tier and smallest tier of the first punch.

Consequently, this aspect of the invention does away with the smallest tier of recess in the largest fasteners, opening it out, preferably, into an extension of the second smallest tier of the recess. The depth is maintained, of course, to permit full entry of the tool.

This measure then, does not significantly adversely affect the torque transmission. Indeed, on the larger screws, the torque transmission by the smallest tier is de minimis when compared with the more deeply embedded, largest tier. Instead, it reduces punch breakage and it prevents incomplete engagement of the tool with the recess of the fastener. Nor does it affect the use of the same driving tool on smaller sizes of screws that are provided with the small recess tier, so that this aspect of the system is not impaired.

SUMMARY OF THE INVENTION

The invention is further described hereinafter, by way of example, with reference to the accompanying drawings, in which.

Figure 1:
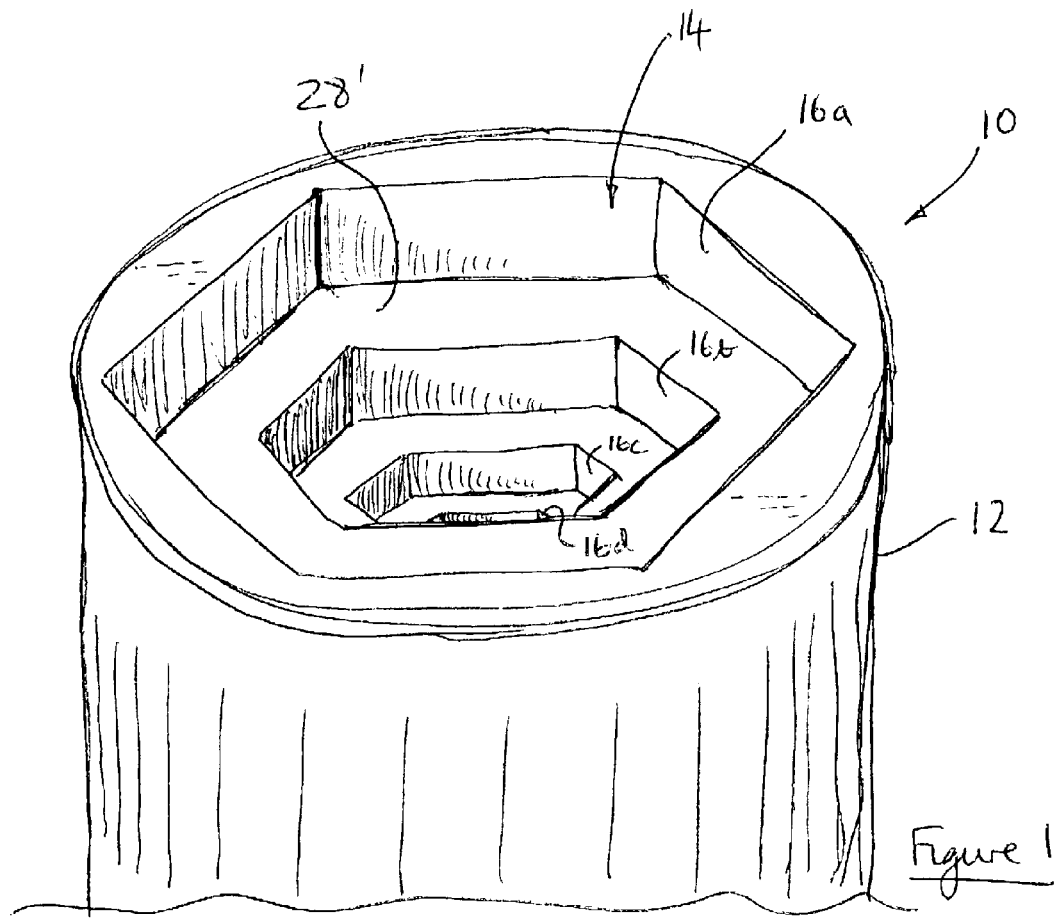
FIG. 1 is a perspective view of a fastener from a larger size range of fasteners, and having four driving tiers.
Figure 2:
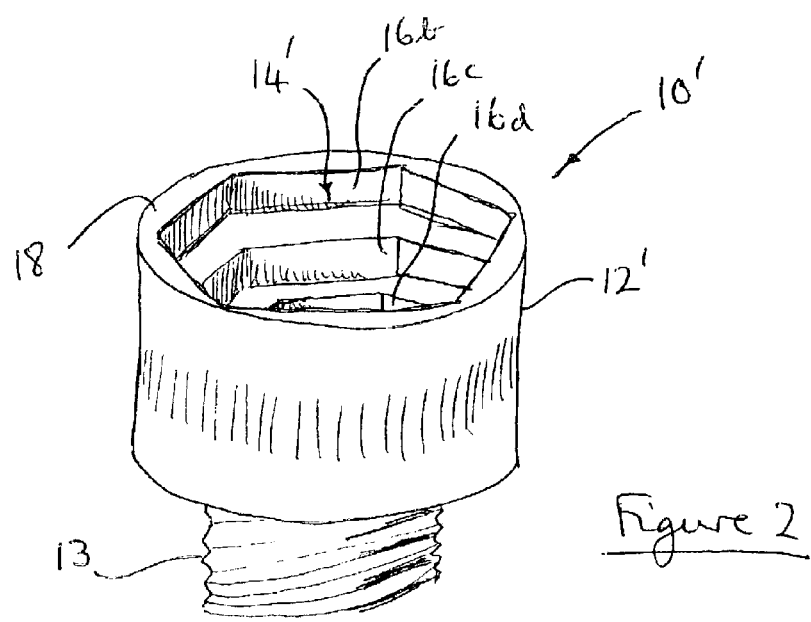
FIG. 2 is a view similar to FIG. 1 of a smaller fastener from the same range, but having only three driving tiers.
Figure 4:
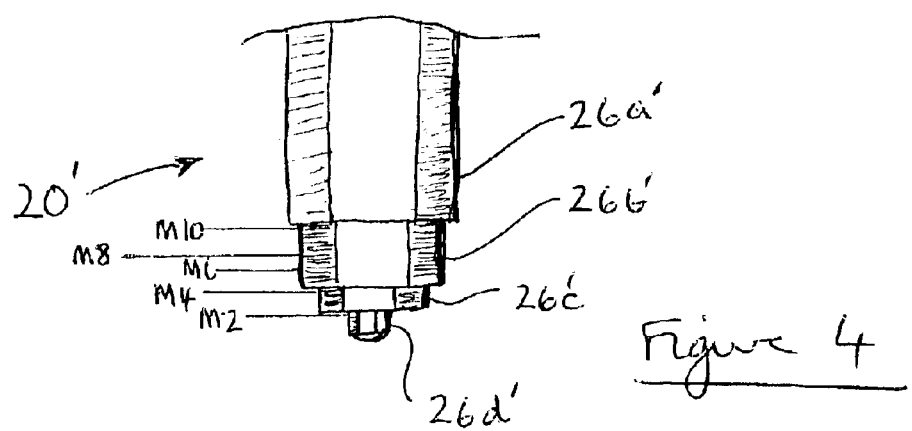
FIG. 4 is a side view of a driving tool for a smaller size range of fasteners than those shown in FIGS. 1 and 2.
Figure 5A:
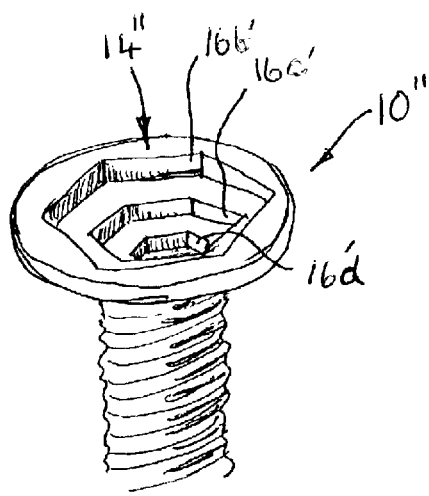
Figure 6A:
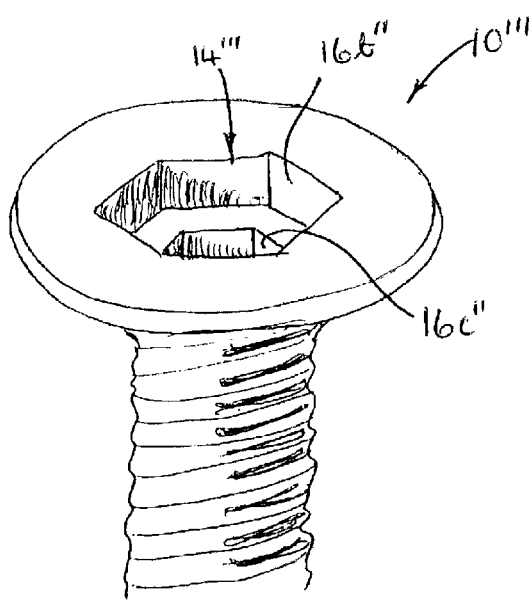
Figure 7:
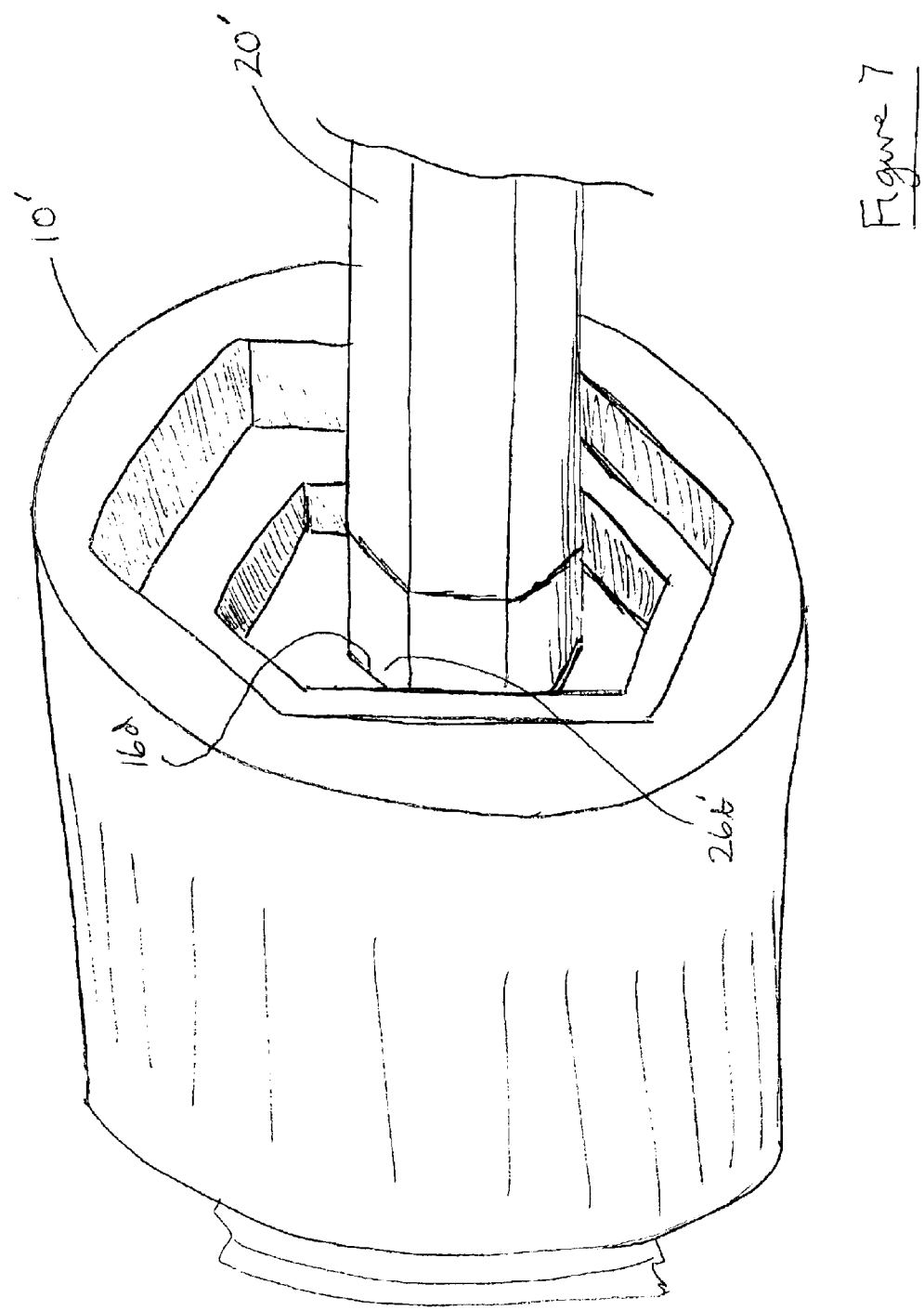

FIGS. 5a and b are a perspective view and side view, partly in section, respectively, of a medium sized fastener from the smaller size range of fasteners compared with those shown in FIGS. 1 and 2, and which are adapted to be driven by the tool of FIG. 4;

FIGS. 6a and b are similar to FIGS. 5a and b of a larger sized fastener from the smaller size range, and being an example of the second aspect of the present invention and being adapted to be driven by the tool shown in FIG. 4; and FIG. 7 shows the tool of FIG. 4 engaging the fastener of FIG. 2.

DETAILED DESCRIPTION OF PREFERRED EMBODIMENTS

Referring to FIG. 1, a fastener 10 has a head in the form of a cap 12 and a depending thread (not shown). A central recess 14 is formed in the cap 12 and has 4 driving tiers 16a to d. Each tier is shown as a hexagon in section, each tier being coaxial and aligned with the central longitudinal axis of the fastener 10. However, the fact that the tiers are hexagonal and aligned, both rotationally and transversely, is merely for convenience. The driving tiers 16a to d could be any non-circular section, could be rotationally offset with respect to one another, and could be transversely offset. On the other hand, each tier must be within the confines defined by the preceding tier. That is to say, tier 16d is within the confines defined by tier 16c, which is in turn within the confines of tier 16b, and which is in turn within tier 16a.

FIG. 2 shows a similar fastener 10', which differs from the fastener 10 of FIG. 1 in having a smaller cap 12' and a smaller thread 13. For example, the cap screw of FIG. 1 might be an M16 screw, whereas the screw of FIG. 2, in the same scale, is more likely to be M12. The screw 10' also has a recess 14', except here there are only three tiers 16b,c and d, where the tiers 16b to d correspond exactly to with the tiers 16b to d of FIG. 1.

Figure 3:
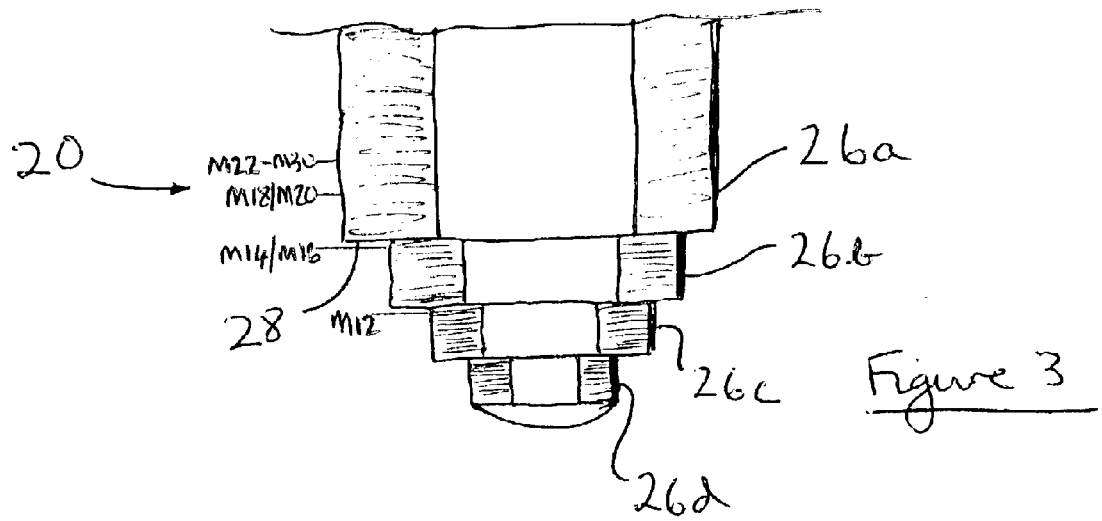
FIG. 3 is a side view of a driving tool for use with the fasteners of FIGS. 1 and 2.

Referring to FIG. 3, a driving tool 20 is shown, suitable for driving the fasteners 10,10' of FIGS. 1 and 2. Tool 20 has driving flanges, or tiers, 26a,b,c and d, where tier 26d is a close sliding fit in recess tier 16d of the fasteners 10,10' of FIGS. 1 and 2. Likewise, tier 26c is a close sliding fit in the tier 16c, and likewise tiers 26b and a in recess tiers 16b and a respectively. It is apparent that the base 28 of recess 26b of the tool 20, when it engages fastener 10' of FIG. 2, will sit on a top face 18 of the fastener 10'. However, when the same tool 20 is employed to drive the fastener 10 of FIG. 1, flange 26a will enter recess tier 16a, and base 28 will abut land 28' between the bottom of tier 16a and top of tier 16b. Consequently, the torque transmission between the tool and fastener 12 can be much greater than that between the tool 20 and fastener 10' of FIG. 2. This is desirable, of course, given the difference in size between the fasteners 10,10'. Indeed, should fasteners even larger than the fastener 10 of FIG. 1 be employed, then simply the depth of tier 16a is increased.

Figure 5B:
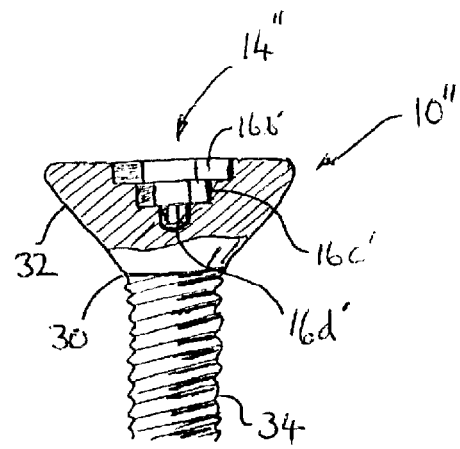
Figure 6B:
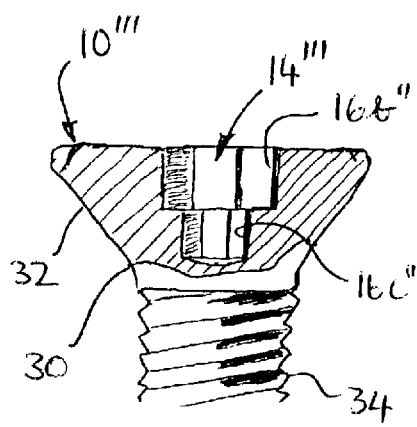

FIGS. 5a and b show a further fastener 10", which, in this instance, is a countersunk machine screw. The size of the screw may be anything from M2 to M10 although, with a three tiered recess 14" as shown, it is likely to be M6 or larger (although M10 is preferably as shown in FIG. 6, described further below). The recess 14" appears similar to the recess 14' of FIG. 2. However, the dimensions are very much less. Indeed, the dimensions of an example of the present invention are shown in Table I below, and from which it can be seen that the diameter of recess tier 16b' of the fastener 10" is the same as the diameter of recess 16d of fastener 10'. Moreover, the depth of recess tier 16d of fastener 10' of FIG. 2, is more than a millimetre deeper than the combined depths of tool tiers 26c' and 26d' (see FIG. 4). What this means is that a tool 20' as shown in FIG. 4, that fits recess 14" of the fastener 10" of FIG. 5, will fit in the recess 16d of the fasteners 10 and 10' of FIGS. 1 and 2.

TABLE I

| Tier | Depth (mm) | Diameter (mm) |
|---|---|---|
| 16d | 3.5 | 5.9 |
| 16d' | 1.5 | 2 |
| 16c | 2.7 | 10 |
| 16c' | 1 | 4 |
| 16b | 2.7 | 14 |
| 16b' | Up to 3 | 5.9 |
| 16a | Up to 11 | 19 |

Moreover, the tool tier 26d of the tool 20 will fit in the recess tiers 16b' and 16b" of the fasteners 10" and 10"' in FIG. 5a and 6a respectively.

FIG. 4 shows a tool 20' for driving the smaller range of screws shown in FIG. 5, and also FIG. 6, as described further below. The tool has three driving flanges or tiers 26b',c' and d' that fit the recesses 16b',c' and d' described above of the fastener 10" of FIG. 5a. The flanges 26b',c' and d' are formed on a root-section 26a' of hexagon bar which is 6 mm in diameter and is the section commonly employed for screwdriver bits employed by power tools. Marked on FIG. 4, and also on FIG. 3, is the depth to which the tool 20', and 20 in the case of FIG. 3, enters the recess of differently sized screws in the two size ranges M2 to M10 and M12 to M30. From this, it can be seen that section 26a' is not employed as a driving flange or tier. The depths of the largest tier is given in Table II below.

TABLE II

| Bolt Size | Maximum Torque Required (Nm) | Breaking torque achieved (Nm) | Largest Tier | Depth of Largest Tier (mm) |
|---|---|---|---|---|
| M2.5 | 0.7 | 1.5 | 26d' | 1.5 |
| M4 | 4.1 | 5.8 | 26c' | 1 |
| M6 | 14 | 21 | 26b' | 1 |
| M8 | 35 | 52 | 26b' | 2 |
| M10 | 69 | 89 | 26b' | 3 |
| M12 | 120 | | 26c | 2.7 |
| M14 | 190 | | 26b | 2.7 |
| M16 | 295 | | 26b | 2.7 |
| M18 | 405 | | 26a | 3 |
| M20 | 580 | | 26a | 3 |
| M22 | 780 | | 26a | 4 |
| M24 | 1000 | | 26a | 4 |
| M26 | 1250 | | 26a | 5 |
| M28 | 1600 | | 26a | 5 |
| M30 | 2000 | | 26a | 6 |

In Table II, the Maximum Torque Required is the generally accepted tightening torque for that size of bolt in 10.9 grade steel and average frictional engagement with the corresponding nut thread. In fact, it is also a general requirement that the thread of a bolt should shear before failure of the drive to the bolt from the driving tool through the head of the bolt. This torque is generally about 15% greater than the minimum breaking torque for the threaded section of the bolt. With the tools to which the present invention relates, these torques are achievable by some margin, as shown in Table II. Referring now to FIGS. 6a and b, the fastener 10''' is shown having a recess 14''' which differs from the recess 14'' of the fastener 10'' shown in FIGS. 5a and b in the following respects. Because fastener 10''' is larger than the fastener 10'', for example, it may be an M10 screw, its largest recess 16b'', corresponding in diameter with the recess 16b' of screw 10'' of FIG. 5a, has an enlarged depth. The torque transmission possible by that tier is therefore enhanced. Because of that, the contribution of the smallest tier becomes essentially de minimis. Instead, if a tier 16d' was provided, it would have two adverse effects.

The first effect is brought about by the method of manufacture of screws with which the present invention is concerned. This method involves cold-forming using a punch having a profile corresponding with the desired shape of the recess 14'''. Moreover, because cold-forming involves a certain elastic rebound of the metal after it has flowed to the required shape on impact of the punch, the rebound tends to grip the punch and prevent its withdrawal from the formed head. Indeed, it is for this reason that the punch is slightly larger than the desired final shape so as to accommodate this rebound effect. However, the pip on the end of the punch (not shown, looking like tool 20' in FIG. 4 and corresponding with tier 26d' thereof) is somewhat vulnerable given its small dimension. It can, with repeated use, shear off. This is particularly the case when the punch is driven deep into the head of a screw to form the deeper recess required in the larger screws of this size range.

The second effect is exposed by the frequent desire to coat screws, particularly those for use in the automotive industry, with a lacquer that gives the screw corrosion resistance. Given the small size of the recess tier 16d', the lacquer in that tier can inhibit full engagement of the driving tool with the recess.

Accordingly, in larger screws 10''' (of this smaller size range of screws and bolts), the second recess tier 16c'' is also extended in depth to open out what would be the recess 16d', if that was provided. This, then, removes the pip from the punch (not shown) that forms the recess 14''', and therefore removes the possibility of that tip breaking off. Consequently, the lifetime of the punch is improved. Secondly, the small well that would be formed by a recess 16d' is removed, so that full engagement of the driving tool 20' with the recess 14''' is not hindered. The only negative effect is a small loss of driving potential through the tool tier 26d'. However, as already stated, this is de minimis when compared with the increased size of recess tier 16b''.

Such an arrangement would also be preferable for the smaller screws, except that with smaller sizes than M8, the extended middle tier 16c'' would come too close to the neck 30 between the head 32 and shank 34 of smaller versions of the screw 10'''. Moreover, on such screws, the recess 14''' could not be so deep, and therefore the loss of driving capability as represented by the small tier 16d' would become more relevant. Also, the capability to use the same tool 20' on small screws that can only have a single tier recess of the size of tier 16d'.

However, both the problem of punch tip breakages and complete insertion of the driver tool into the recess are less problematic with the shallower recesses of the smaller screws. In the first case, the punch tends to be withdrawn before the screw head grabs the pip on the end of the punch, and, in any events there is less force in the rebound due to the smaller bulk of the head 32 of smaller screws. Secondly, the lacquer has a shorter escape route when a tool is inserted into a recess 14'' of a smaller screw, so that it is less likely to stop full engagement for the same insertion force of the tool in the recess.

Finally, turning to FIG. 7, one of the benefits of arranging for the smallest recess tier 16d of the larger range of screws 10,10' to be the same size as the largest tier 26b' of the tool 20' for driving the smaller range of screws 10'',10''', is that a tool 20' can be used to manoeuvre and initiate drive of the larger range of screws. This facilitates handling of the larger screws, particularly in confined spaces. Also, it has the advantage that, if a user mistakenly picks-up the wrong tool 20' (or finds that his/her driver has the wrong bit in it, it still can be used to drive the screw 10,10', at least until it is finger tight.

The invention is also concerned with the punches that form the recesses of the present invention. There is no separate illustration of the punches, because they correspond essentially with the driving tools. There are differences with the driving tools, in terms of material and minor, although essential, dimensional differences, that would be apparent to those skilled in the art. Therefore no further elaboration is required herein.

In the first aspect, the set of punches comprises at least one having the form of the tool in FIG. 3, and another having the form of the tool of FIG. 4. In the second aspect, the set of punches comprises at least one having the form of the tool in FIG. 4, and another having a form that is not shown herein as a tool. That is because the same tool of FIG. 4 is employed to drive the recess, despite the recess being different in profile to the tool. Nevertheless, the profile of the other punch corresponds with the recess 14''' of the screw 10''' in FIG. 6.

What is claimed is:

1. A fastener system comprising a plurality of ranges of size of threaded fastener, each fastener having a head provided with a recess to receive a tool to rotatingly drive the fastener, each recess having a floor, and wherein:

in each range of sizes, the largest size of fastener has a recess comprising a plurality of driving recess tiers of reducing size superimposed on one another, each recess tier having sides, which sides are substantially parallel a long axis of the fastener and define a polygon in section, each recess tier having a base, which base is the junction with the adjacent smaller tier recess, or with the floor of the recess in the case of the smallest recess tier;

between two adjacent size ranges, there is a common recess tier, being the largest recess tier of the recess of the smaller size range and the smallest recess tier of the recess of the larger size range, which common recess tier is the same section in each range; and the depth from the base of the largest recess tier to the floor of the smallest recess in the smaller size range is less than the depth of the smallest recess tier in the larger size range.

2. The fastening system of claim 1, wherein the fastener system includes two size ranges of fasteners comprising screws of diameters from 2 mm to 10 mm and from 10 mm to 30 mm.

3. The fastening system of claim 2, wherein the screws are size M2 machine screws to size M10 in the small size range and size M12 to M30 in the large size range.

4. The fastening system of claim 1, wherein the common recess tier is hexagonal in section.

5. The fastening system of claim 1, wherein the common recess tier has a diameter of about 6 mm.

6. The fastening system of claim 1, wherein the smaller size range of fasteners has three recess tiers in larger fasteners, two recess tiers in middle size fasteners, and one recess tier in the smallest fasteners.

7. The fastening system of claim 1, wherein in the smaller size range of fasteners, the larger fasteners have two recess tiers comprising the common recess tier of a first depth and a smaller recess tier of a second depth, and middle size fasteners have three recess tiers comprising the common recess tier of a second depth being less than the first, a smaller recess tier of a fourth depth less than the second, and a smallest recess tier.

8. The fastening system of claim 7, wherein small size fasteners have two recess tiers comprising said smaller recess tier and said smallest recess tier, and smallest size fasteners have one recess tier comprising said smallest recess tier.

9. The fastening system of claim 1, wherein the recess tiers are formed using a set of punches having recess tier-forming, said set including one punch for a smaller size range of fasteners that has a largest recess tier-forming section of a common section, and another punch that has a smallest recess tier-forming section of the same common section.

10. The fastening system of claim 1, wherein the common recess tier has a diameter of 5.9 mm.

11. A fastening system for a range of different sizes of fastener in which each fastener is provided with a recess to receive a tool to rotatingly drive the fastener, wherein:

the tool has an end, on which end at least three tiers of driving section are provided, each tier comprising sides disposed substantially parallel a long axis of the tool and forming a polygon in section, the tiers becoming progressively smaller in section near the end of the tool; and the range of fasteners to be driven by the tool includes a first fastener whose recess is shaped to be drivingly engaged by at least the third and second smallest tiers of the tool, but not the smallest tier, the recess receiving the second smallest tier of the tool being deep enough to accommodate the smallest tier of the tool without any driving engagement therebetween, and without preventing full engagement of said second and third tiers in the corresponding recess tiers of the recess in the fastener.

12. The fastening system of claim 11, wherein the range of fasteners to be driven by the tool includes a second, smaller fastener whose recess is shaped to be driven by the smallest, and the second and third smallest, tiers of the tool, wherein:

when the tool is inserted in a recess of a fastener to the maximum extent permitted by the size of the tool and recess, each tier of the tool has a depth of engagement with a corresponding one of said recess tiers of a fastener, which depth of engagement is the overlap between said tier of the tool and said corresponding recess tier of the fastener; and the recesses of the first and second fasteners are such that the depth of engagement of the third smallest tier of the tool in the recess of the second fastener is less than the depth of engagement of the third smallest tier of the tool in the recess of the first fastener.

13. The fastening system of claim 11, wherein the range of fasteners comprises screws of diameters from 2 mm to 10 mm.

14. The fastening system of claim 13, wherein the screws are size M2 machine screws to size M10.

15. The fastening system of claim 11, wherein the range includes a second, smaller fastener whose recess is shaped to be driven by the smallest, and the second and third smallest, tiers of the tool, wherein:

the recesses of the first and second fasteners are such that the depth of engagement of the third smallest tier of the tool in the recess of the second fastener is less than the depth of engagement of the third smallest tier of the tool in the recess of the first fastener; and said first screw is M10 and said second screw is M8.

16. The fastening system of claim 15, wherein the recesses of the first and second fasteners are such that the depth of engagement of the third smallest tier of the tool in the recess of the second fastener is about 1 mm and the depth of engagement of the third smallest tier of the tool in the recess of the first fastener is about 3 mm.

17. The fastening system of claim 11, wherein the tiers are hexagonal in section.

18. The fastening system of claim 11, the third smallest tier has a diameter of about 6 mm.

19. The fastening system of claim 11, wherein the recess tiers are formed using a set of punches having recess tier-forming sections, said set including a first punch for a smaller size of fastener and that has three recess tier-forming sections, and a second punch for a larger size of fastener and that has two recess tier-forming sections, wherein:

the larger recess tier-forming section of the second punch has the same-sized section as the largest recess tier-forming section of the first punch;

the smaller recess tier-forming section of the second punch has the same-sized section as the middle sized recess tier-forming section of the first punch; and each recess tier-forming section has a length corresponding to a depth of a recess tier of the fastener, the length of the smaller recess tier-forming section of the second punch being the same or longer than the combined length of the middle sized recess tier-forming section and smallest recess tier-forming section of the first punch.

20. The fastening system of claim 11, wherein the third smallest tier has a diameter of 5.9 mm.

* * * * *